United States Patent [19]

Srinivasan

[11] Patent Number: 5,024,802

[45] Date of Patent: Jun. 18, 1991

[54] METHOD FOR STEAM GENERATOR WATER LEVEL MEASUREMENT

[75] Inventor: Jagannathan S. Srinivasan, Murrysville, Pa.

[73] Assignee: Westinghouse Electric Corp., Pittsburgh, Pa.

[21] Appl. No.: 600,951

[22] Filed: Oct. 22, 1990

[51] Int. Cl.$^5$ ............................................. G21C 17/00
[52] U.S. Cl. .................................. 376/258; 376/246; 376/247
[58] Field of Search ............... 376/245, 247, 258, 246; 73/1 H; 122/451, 451.1, 451.2, 456

[56] References Cited

U.S. PATENT DOCUMENTS

| | | | |
|---|---|---|---|
| 4,275,447 | 6/1981 | Ruiz | 364/494 |
| 4,302,288 | 11/1981 | Youngborg | 376/210 |
| 4,765,945 | 8/1988 | Walleser | 376/258 |

FOREIGN PATENT DOCUMENTS 2312728 12/1976 France ............................. 122/451 R Primary Examiner—Brooks H. Hunt
Assistant Examiner—Chrisman D. Carroll

[57] ABSTRACT

A method is provided for determining and controlling steam water level in a steam generator of a nuclear plant, comprising calibrating the water level sensor in terms of velocity head and also adjusting the high level setpoint in terms of a velocity head bias. The water level differential pressure sensor is calibrated so that maximum water level is indicated as that level corresponding to the upper tap level less velocity head at maximum power plant power. The high level setpoint is calculated as corresponding to the riser level less a velocity head bias, the bias being calculated as maximum velocity head at maximum velocity minus riser head percentage of span times velocity head at maximum power.

6 Claims, 2 Drawing Sheets

METHOD FOR STEAM GENERATOR WATER LEVEL MEASUREMENT

FIELD OF THE INVENTION

This invention relates to a method for water level measurement in a steam generator such as used in pressurized water reactors and, more particularly, water level measurements using differential-type transmitters for sensing water level in a steam generator in a nuclear power plant.

The current steam water level measurement methodology is built around the use of differential-type transmitters for comparing the steam generator water level with a reference leg pressure input. The transmitter responds to a differential of water pressures inputted to it, and provides an output representative of the difference between a reference leg pressure and the pressure to the height of the liquid in the steam generator. This differential is a good correlation to water level when the lower pressure tap, for measuring the water level in the steam generator, is located in a relative low velocity region of the steam generator. However, if the lower pressure tap is moved to a higher velocity region, an error is introduced due to the effective velocity head of the moving water. In such circumstances, a level measurement penalty must be taken, meaning that the steam generator operating level margin, i.e., a range of permissible water levels, needs to be reduced. Present steam generator design calls for the lower level tap to be relocated in the high velocity region so as to minimize well known shrink/swell phenomenon. Accordingly, there is a need for an improved methodology to account for the velocity head effects in the transmitter calibration, so as to maximize the steam generator level operating margin.

SUMMARY OF THE INVENTION

It is an object of this invention to provide, in a steam generator used in a pressurized water reactor nuclear power system, an improved method of measuring the water level in the steam generator and taking into account a velocity head effect for determining the operating margin, i.e., the range of water levels within which operation is controlled. In accordance with this object, calibration of the differential pressure transmitter includes subtracting a bias factor from the differential pressure at maximum water level, the bias factor being said equal to the velocity head at 100% power level, or another determined fraction of maximum velocity head, thereby to adjust the transmitter reading at maximum water level (and minimum meter reading) to account for a velocity head. The high level trip setpoint is calculated by determining the net water level, e.g., corresponding to the top of the riser minus a bias, or adjustment for velocity head due to the calibration at the riser, which is some percentage of the span between the lower and upper taps.

DESCRIPTION OF THE PREFERRED EMBODIMENT

Figure 1:
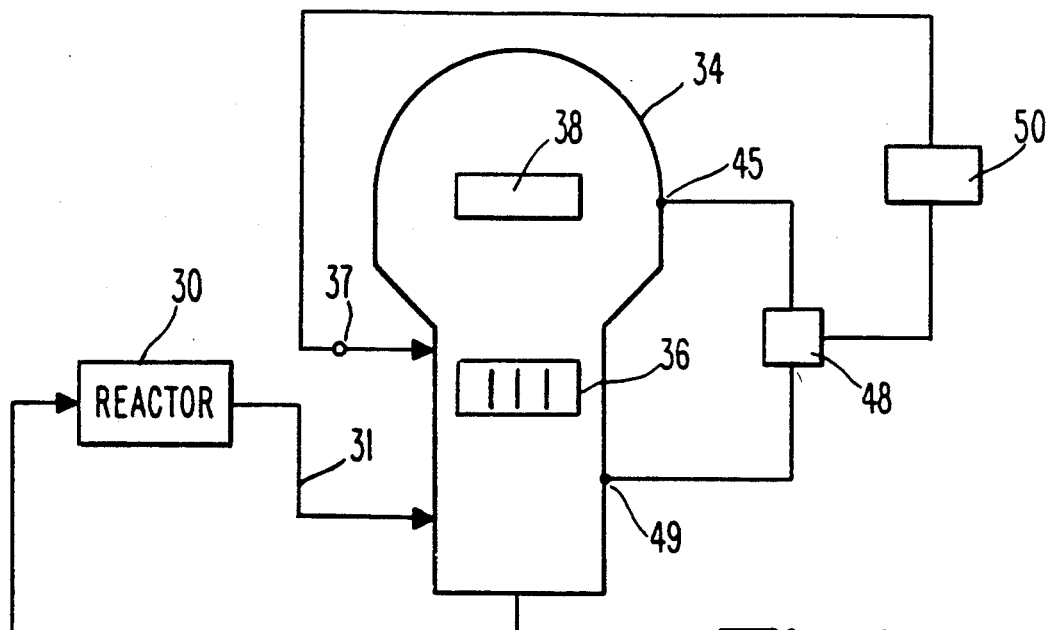
FIG. 1 is an overall block diagram showing the environment of a steam generator for which the method of this invention is used.

Referring now to FIG. 1, there is shown a very rudimentary block diagram of a typical pressurized water reactor system. The reactor 30 generates hot water which is coupled through suitable piping 31 to a steam generator 34. The heat transfer water from the reactor is circulated through heat transfer tubes illustrated at 36, where it imparts its heat to feedwater introduced as shown at 37, and then is returned to the reactor. The rising steam is passed through moisture separation apparatus illustrated at 38. As is well known, there is minimum level that must be maintained in the steam generator, and there is also a maximum level within which the water must be maintained or else the moisture would not be properly separated from the steam.

Figure 2:
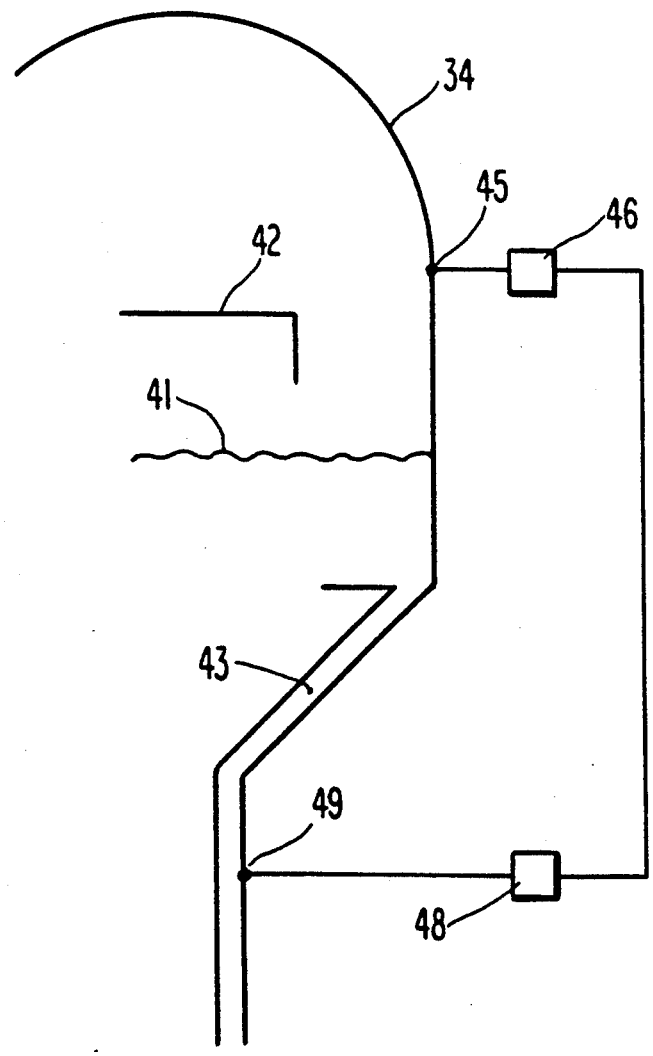
FIG. 2 is a schematic representation indicating measurements taken in carrying out the method of this invention.

Referring now to FIG. 2, there is shown a schematic diagram illustrating the measurements taken in practicing the method of this invention. A steam generator is illustrated at 34, and the nominal water level is illustrated at 41. The top of the riser, through which the steam comes, is illustrated at 42. The operating premise is that the water level should not rise above the top of the riser. The downcomer area, through which recirculated water is passed, is illustrated at 43. The upper tap is illustrated at 45; steam is condensed in condensate pot 46, which fills the reference leg between 46 and 48. This provides a reference pressure which is inputted to a first input of DP transmitter 48, e.g., about 262 inches (6.655 meters) of water at 80° F. (26.67° C.). Thus, the first input to the differential transmitter 48 is a pressure representing a reference leg. The lower tap 49 provides a second water pressure signal which is inputted to DP transmitter 48, the transmitter generating a signal which is representative of the difference of the SG water level and the reference leg. Lower tap 49 is located in the high velocity region. Thus, for a water at its maximum level, the transmitter output is at its minimum; when the water level is at its lowest level, the transmitter output is at its maximum. In practice, the output of transmitter 48 is connected to a control 50 (FIG. 1), which controls the SG water level by controlling feedwater input at 37.

In the typical current manner of operation, the differential pressure seen by the transmitter is calibrated to be the difference between the reference leg pressure and the pressure due to the column of the water or process liquid at its 100% level (upper tap). The method of this invention includes a correction factor to the static pressure at 100% level, to account for the velocity head generated at the lower tap. Additionally, the method reduces the velocity head penalty taken in selection of the high level trip setpoint, thereby increasing the normal operating margin.

In current systems, the DP transmitter is calibrated at minimum and maximum water levels assuming static conditions. Thus, for a minimum water level corresponding to the lower tap 49, the pressure differential is greatest, and the transmitter is calibrated to its maximum output For example, for a span of 262 inches (6.655 meters), the differential pressure calculates to 220 inches (5.588 meters), corresponding to a DP output of 20 ma. For 100% water level where the transmitter output should be minimum, calibration is performed by inputting a calculated differential pressure corresponding to the 100% level and adjusting the meter to provide minimum output. Thus, calibration is made without any consideration of the effect of velocity head. For example, a water level at the upper tap results in a calculated 60 inches (1.524 meters) differential pressure, and a DP reading of 4 ma. The high level trip setpoint is calculated as the water head equal to a water level at the top of the riser, minus the maximum velocity head. The maximum velocity head in turn is calculated as follows:

$$A = \text{Maximum Velocity Head} = \frac{(\text{Density of Water}) \times (\text{Square of the Maximum Water Velocity Past the Lower Tap})}{2g}$$

Figure 3:
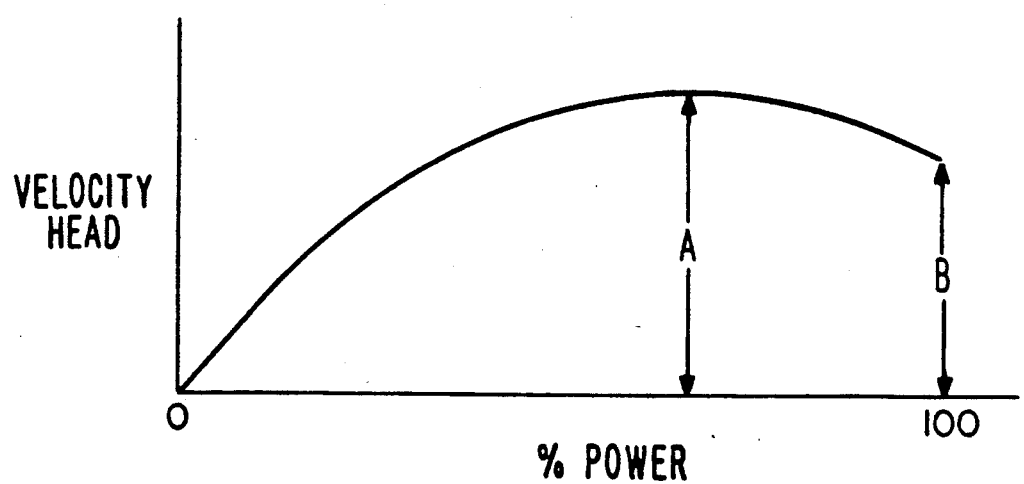
FIG. 3 is a curve representing velocity head vs. percent power.
Figure 4:
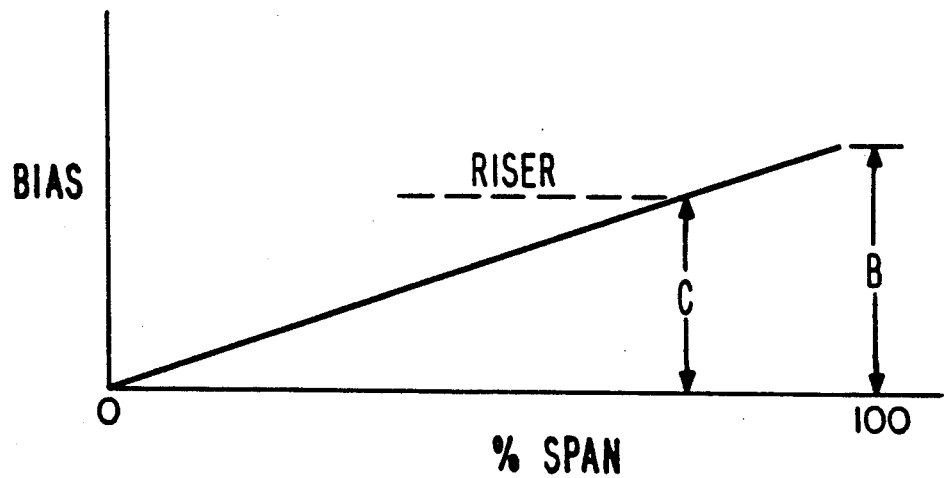
FIG. 4 is a curve representing the bias in calibration vs. percent level span.

The maximum velocity occurs between 50-60% power, as seen in FIG. 3. The maximum velocity head error is defined as the penalty due to velocity head. Thus, in the current procedure the elevation of the high level trip setpoint is selected equal to the elevation of the riser minus the velocity head measurement A as illustrated in FIG. 3. A typical value of A is 40 inches (1.016 meters); for a riser at 80% span, the high level trip setpoint is 170 inches (4.318 meters), i.e., 210-40.

In the invention of this application, calibration is adjusted by introducing a bias at the 100% water level indication. Thus for maximum water level, corresponding to the minimum transmitter output, the differential pressure is the difference between the reference leg pressure, and the pressure due to the column of the process liquid further adjusted by a bias B illustrated at FIG. 3. Bias B may be selected as the velocity head at 100% power level, or alternately may be any other fraction of the maximum velocity head A. Taking the bias at 100% power, the velocity head bias B is determined as follows:

$$B = \frac{(\text{Density of Water}) \times (\text{Square of the Water Velocity Past the Lower Tap at 100\% power})}{2g}$$

Thus, in the practice of this invention, the maximum water level calibration is performed by calculating the pressure due to the water, and subtracting from that calculation a bias B calculated as set forth immediately above. The calculated equivalent differential water pressure is inputted to the transmitter, and the transmitter is calibrated to its minimum value. By way of example, for a B value of 30 (0.076 for metric units), the net calculated differential pressure at full water level is calculated to be 90 inches (2.286 meters), which would correspond to minimum transmitter reading of 4 ma. The low water level differential pressure would again typically be 220 inches (5.588 meters) of water, corresponding to a maximum or full meter reading of 20 ma.

In the method of this invention, the high level trip setpoint is selected by subtracting from a water pressure equal to the top of the riser an adjusted bias equal to the difference between the maximum velocity head measurement (measurement A in FIG. 3) and a velocity head bias which takes into account the fact that the riser is only at a certain percentage of span between the lower and upper taps, e.g., 80% span. Specifically, the high level trip setpoint (HLSP) is determined as follows:

$$HLSP = (\text{Top of the Riser}) - (A - C),$$

where
A is the maximum velocity head and,
$C = (\text{Riser Percentage of Span}) \times (\text{Maximum Power Velocity Head B})$
The value of C is the gain in operating margin, e.g., $80\% \times B$, due to adjusting the bias in accordance with this invention.

For example, for a riser at 80% span and a span of 262 inches (6.655 meters), the riser is 210 inches (5.334 meters). C is $80\% \times 30 = 24$ inches (0.061 meters), so $(A - C) = 16$ inches (0.046 meters). Thus, HLSP is 194 inches (4.9276 meters).

After calculation of high level setpoint, the use determines what meter reading corresponds to that setpoint, for purposes of taking control action. Set forth below are representative exemplary calculations for converting the calculated high level setpoint to a corresponding meter reading, based on the premise that the meter reading is linear between the calibrated minimum and maximum outputs.

A. Prior Art Example

For calibration, for a span of 262 inches (6.655 meters), there is a 60 inches (1.524 meters) differential pressure applied to the meter corresponding to full water level, yielding a meter output of 4 ma. The 60 inches (1.524 meters) differential is due to the fact that the steam water is at 500° F. (260° C.), whereas the reference leg water is at only 80° F. (26.67° C.). When water is at the lower tap, the pressure differential is 220 inches (5.588 meters). Thus, the meter range of 4 to 20 ma (16 ma) corresponds to a pressure range of 160 inches (4.064 meters). In computing the high level setpoint, the riser level is 210 inches (5.334 meters), and A=40 inches (1.016 meters), so setpoint is 170 inches (4.318 meters). Since a level of 170 inches (4.318 meters) represents 92/160 of the difference between 60 and 220, the corresponding meter reading is 4+92/160 (16), or 13.2 ma.

B. Invention Example

For the invention, the full (100%) water calculation is 90 inches (2.286 meters), so 4 ma corresponds to 90 inches (2.286 meters). At the lower tap, 16 ma corresponds to 220 inches (5.588 meters). Thus, the 16 ma range corresponds to a pressure differential range of 130 inches (3.302 meters). The high level setpoint is 210-(40-24), or 194 inches (4.9276 meters), and the corresponding meter reading is 4+66/160 (16), or 10.6 ma.

It is to be understood that the examples used in this specification are illustrative only. For example, high level setpoint need not be based on the riser level, but could be somewhat above the riser Also, it is to be understood that different pressure sensor means may be used, and the invention is general in responding to pressure sensor output. Thus, as described the invention is used with an analog differential pressure transducer, which provides an analog output in ma, varying from a lower limit to an upper limit. Other pressure sensor means are within the state of the art, and the output may be in terms of a digital response. The technique of utilizing the pressure sensor means output to control water level may be accomplished with any state of the art hardware and/or software, and the invention is not limited in terms of the system components actually used. As set forth in the appended claims, the important innovative features, which distinguish over the prior art, are those of calibrating the level sensor means to take velocity head into account, and calculating the high level setpoint by including a bias or penalty amount which is related to velocity head and the physical position of the high level limit.

I claim:

1. In a nuclear power plant, a method of controlling the steam generator water level, wherein the steam generator has an upper level tap corresponding to an upper level, a lower level tap corresponding to a lower level, a riser positioned between said lower and upper taps, and level sensor means for indicating water level between a first range limit and a second range limit, said sensor means being connected to at least said lower tap, comprising:

calculating a measure of velocity head at about the lower level tap;

calculating a measure of full water level as the upper level less said measure of velocity head;

calibrating said level sensor means to provide an output at said first limit corresponding to an input thereto representative of said measure of full level;

calculating a high level setpoint equal to the level of said riser less a bias amount which is a function of the position of said riser relative to the span between said taps; and controlling said water level when said sensor means indicates that said high level setpoint has been reached.

2. The method of claim 1, wherein said sensor means senses differential pressure and has inputs connected to said lower and upper taps respectively, and comprising calculating the differential pressure for water level at said lower tap and calibrating said level sensor means to provide an output at said second limit corresponding to water level at said lower tap.

3. The method of claim 2, wherein said measure of velocity head is velocity head at maximum power.

4. The method of claim 3, comprising calculating said bias amount as maximum velocity head less riser span percentage times velocity head at full power.

5. A method of monitoring water level relative to a high level control threshold in a steam generator, said steam generator being operated with a water level between a lower level and an upper level, said threshold being between said lower and upper levels, and having pressure sensing means subject to water velocity error for measuring said water level, comprising determining a first measure of velocity head corresponding to water at said upper level;

determining a second measure of velocity head corresponding to water level at said threshold level;

calibrating said level sensing means to provide a maximum indication of water level at said upper level adjusted by said first measure, and to provide a minimum indication of water level corresponding to water level at said lower level; and determining said high level control threshold corresponding to water level at said threshold level less said second measure.

6. A method for monitoring the water level in a steam generator of a nuclear power plant so as to be able to control said water level relative to the steam generator riser, comprising the following steps:

positioning an upper tap on said steam generator above said riser and obtaining a reference level pressure corresponding to the water read at said upper tap;

positioning a lower tap below said riser and in a high velocity region of said steam generator and obtaining a lower tap pressure therefrom, said riser thereby being positioned at a given percentage of the span between said lower and upper taps;

providing a differential pressure sensor having an output range between lower and upper limits;

calculating a first differential pressure between said reference level pressure and said lower tap pressure when steam water is at said lower tap, and calibrating said sensor to indicate said upper limit when said first difference pressure is placed thereacross;

calculating a second differential pressure between said reference level pressure and a net pressure calculated for water at said upper tap less velocity head at maximum power plant power, and calibrating said sensor to indicate said lower limit when said second differential pressure is placed thereacross;

calculating a differential high level setpoint pressure as the difference between reference pressure and the net pressure calculated as pressure at the lower tap corresponding to water level at said riser less an amount equal to the velocity head at maximum velocity times span percentage; and controlling water level as a function of the sensed differential pressure compared to high level setpoint differential pressure.

* * * * *